US009673585B2

(12) United States Patent
Tsushima et al.

(10) Patent No.: US 9,673,585 B2
(45) Date of Patent: Jun. 6, 2017

(54) ROTARY CONNECTOR HAVING A CABLE IN A WIRING SPACE BETWEEN A ROTARY BODY AND A HOUSING

(71) Applicant: ALPS ELECTRIC CO., LTD., Tokyo (JP)

(72) Inventors: Mitsuo Tsushima, Miyagi-ken (JP); Toshiaki Asakura, Tokyo (JP); Yuji Inada, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/092,971

(22) Filed: Apr. 7, 2016

(65) Prior Publication Data

US 2016/0336704 A1    Nov. 17, 2016

(30) Foreign Application Priority Data

May 11, 2015   (JP) ................................. 2015-096628

(51) Int. Cl.
| | | |
|---|---|---|
| H01R 3/00 | (2006.01) | |
| H01R 35/02 | (2006.01) | |
| H01R 35/00 | (2006.01) | |
| B60R 16/027 | (2006.01) | |
| H01R 43/20 | (2006.01) | |

(52) U.S. Cl.
CPC ......... *H01R 35/025* (2013.01); *B60R 16/027* (2013.01); *H01R 35/00* (2013.01); *H01R 43/20* (2013.01); *H01R 2201/26* (2013.01)

(58) Field of Classification Search
USPC ............................................ 439/13, 16, 164
See application file for complete search history.

(56) References Cited

U.S. PATENT DOCUMENTS

| | | | | |
|---|---|---|---|---|
| 5,238,420 A | * | 8/1993 | Miyahara ............. | H01R 35/025 439/15 |
| 5,951,311 A | * | 9/1999 | Kato ..................... | B60R 16/027 439/164 |
| 6,299,466 B1 | * | 10/2001 | Bolen ................... | B60R 16/027 439/164 |
| 6,341,969 B1 | | 1/2002 | Taniuchi et al. | |
| 6,358,073 B1 | * | 3/2002 | Jhanson .............. | B60R 16/0207 439/164 |
| 8,167,633 B1 | * | 5/2012 | Wu ..................... | H01R 13/6675 439/164 |

(Continued)

FOREIGN PATENT DOCUMENTS

| | | |
|---|---|---|
| EP | 0186935 | 7/1986 |
| EP | 1225098 | 7/2002 |

(Continued)

*Primary Examiner* — Chandrika Prasad
(74) *Attorney, Agent, or Firm* — Beyer Law Group LLP

(57) ABSTRACT

Movable end portions of cables and are fixed to a movable lead block, and fixed end portions of the cables are fixed to a fixed lead block. The movable lead block is mounted so as to be inserted into a cylindrical portion of a rotary body in a direction along a rotation center line, and the fixed lead block is mounted so as to be inserted into a lead block attachment portion of a lower housing in the direction along the rotation center line. The movable end portions and the fixed end portions of the cables are positioned at the same heights as those of the cables in a wiring space.

11 Claims, 8 Drawing Sheets

(56) References Cited

U.S. PATENT DOCUMENTS

| | | | |
|---|---|---|---|
| 8,986,026 B2* | 3/2015 | Utsunomiya | H01R 35/04 439/164 |
| 2002/0168885 A1* | 11/2002 | Araki | H01R 35/025 439/164 |
| 2002/0168886 A1* | 11/2002 | Sakata | B60R 16/027 439/164 |
| 2003/0008541 A1* | 1/2003 | Oguma | H01R 35/02 439/164 |
| 2003/0073333 A1* | 4/2003 | Matsumoto | H01R 39/64 439/164 |
| 2004/0067670 A1 | 4/2004 | Rhein et al. | |
| 2008/0014776 A1* | 1/2008 | Asakura | B60R 16/027 439/164 |
| 2009/0176393 A1* | 7/2009 | Asakura | B60R 16/027 439/164 |
| 2009/0317995 A1* | 12/2009 | Oishi | B60R 16/027 439/164 |
| 2012/0237286 A1* | 9/2012 | Asakura | B60R 16/027 403/164 |
| 2013/0237099 A1* | 9/2013 | Takahashi | H01R 12/592 439/697 |
| 2014/0051266 A1* | 2/2014 | Aikawa | B60R 16/027 439/13 |
| 2014/0051267 A1* | 2/2014 | Asakura | B60R 16/027 439/15 |

FOREIGN PATENT DOCUMENTS

| | | |
|---|---|---|
| GB | 2296392 | 6/1996 |
| JP | 2012-182072 | 9/2012 |

* cited by examiner

ROTARY CONNECTOR HAVING A CABLE IN A WIRING SPACE BETWEEN A ROTARY BODY AND A HOUSING

CLAIM OF PRIORITY

This application claims benefit of Japanese Patent Application No. 2015-096628 filed on May 11, 2015, which is hereby incorporated by reference.

BACKGROUND OF THE INVENTION

1. Field of the Invention

The present invention relates to a rotary connector which is provided in a steering device or the like of an automobile, and has a structure in which a cable is disposed in a wiring space between a housing and a rotary body which is provided inside the housing, and a manufacturing method thereof.

2. Description of the Related Art

Japanese Unexamined Patent Application Publication No. 2012-182072 discloses a rotary connector which is installed in a steering device of an automobile.

In the rotary connector, a movable housing is rotatably combined into a fixed housing, and a flat cable is disposed in an annular space between both housings. A first lead block is fixed to the fixed housing, and a second lead block is fixed to the movable housing. Each lead block includes an insulating support member and a plurality of pin terminals which are held by the support member.

The flat cable is wound such that the surface of the cable is directed so as to be parallel to a rotation center line of the movable housing, and is disposed in the annular space. In addition, a fixed end portion of the flat cable is fixed to the support member of the first lead block, a strip conductor inside the flat cable is welded to a fixed pin terminal, a movable end portion of the flat cable is fixed to the support member of the second lead block, and the strip conductor is welded to a movable pin terminal.

As shown in FIG. 9 of Japanese Unexamined Patent Application Publication No. 2012-182072, in the rotary connector of the related art, in the fixed housing, the annular space into which the flat cable is wound and the first lead block are not disposed at the same position in the direction along the rotation center line of the movable housing, and the annular space and the first lead block are positioned so as to be vertically separated. Accordingly, the fixed end portion of the flat cable wound into the annular space extends so as to be three-dimensionally bent to be extracted below the annular space, and is fixed to the first lead block.

In this structure, a complicated operation of three-dimensionally bending the flat cable is troublesome, and an assembly operation is complicated. In addition, if a bending position of the flat cable is deviated from a design position, unnecessary stress is applied to the flat cable inside the annular space. Accordingly, when the flat cable moves in the annular space, the flat cable is bent or is pressed to an inner wall of the annular space by a strong force, and there is a concern that the flat cable may be damaged by an excessive friction force.

In addition, it is difficult to automatically perform a process of receiving the flat cable in a state where the flat cable is three-dimensionally bent in the annular space, using an automatic machine.

SUMMARY OF THE INVENTION

The present invention provides a rotary connector capable of disposing a cable in a wiring space without complicatedly bending the cable and without applying unnecessary stress to the cable.

In addition, the present invention provides a manufacturing method of a rotary connector capable of easily performing an assembly process and automating an assembly operation.

According to an aspect of the present invention, there is provided a rotary connector, including: a housing: a rotary body which is provided inside the housing; a strip cable which is accommodated in a wiring space between the housing and the rotary body; a movable lead block which fixed to the rotary body; and a fixed lead block which is fixed to the housing, in which the cable is accommodated in the wiring space so as to circulate around a rotation center line of the rotary body. In addition, a movable end portion of the cable is fixed to the movable lead block, a conductor portion of the cable is conducted to a movable terminal provided in the movable lead block, the fixed end portion of the cable is fixed to the fixed lead block, and the conductor portion of the cable is conducted to a fixed terminal provided in the fixed lead block. Moreover, the cable positioned inside the wiring space, the movable end portion, and the fixed end portion are positioned at approximately the same height as one another in a direction along the rotation center line of the rotary body.

In the rotary connection of the present invention, the cable may be fixed to the movable lead block and the fixed lead block without being bent.

In the rotary connection of the present invention, preferably, the movable lead block is assembled to the rotary body in the direction along the rotation center line, and the fixed lead block is assembled to the housing in the direction along the rotation center line.

In the rotary connection of the present invention, each of a plurality of movable terminals may include a movable connection portion to which the conductor portion of the cable is connected, and a movable extension end portion which extends to the outside. The movable connection portion may extend in a direction intersecting the rotation center line, and the movable extension end portion may extend in parallel with the rotation center line. In addition, each of a plurality of fixed terminals may include a fixed connection portion to which the conductor portion of the cable is connected and a fixed extension end portion which extends to the outside. In addition, the fixed connection portion may extend in a direction intersecting the rotation center line, and the fixed extension end portion may extend in parallel with the rotation center line.

In the rotary connector of the present invention, the rotary body may include a circular outer circumferential surface, the housing may include a circular inner circumferential surface, and the wiring space may be formed between the outer circumferential surface and the inner circumferential surface. Moreover, a surface of at least a portion of the movable lead block may appear on the outer circumferential surface, and a surface of at least a portion of the fixed lead block may appear on the inner circumferential surface.

In the rotary connector of the present invention, the cable which is continuous from the movable end portion may be wound around a surface of at least a portion of the outer circumferential surface and the movable lead block and be inverted in a winding direction of the cable in the wiring space. The inverted cable may be wound around a surface of at least a portion of the inner circumferential surface and the fixed lead block and be continuous with the fixed end portion.

Next, according to another aspect of the present invention, there is provided a manufacturing method of a rotary connector including a housing, a rotary body which is provided inside the housing, and a strip cable which is positioned in a wiring space between the housing and the rotary body, including: (1) a step of fixing a movable end portion of the cable to a movable lead block, and conducting a conductor of the cable to a fixed terminal provided in the movable lead block; (2) a step of fixing a fixed end portion of the cable to a fixed lead block and conducting the conductor portion of the cable to a movable terminal provided in the fixed lead block, simultaneously with or before or after the step of (1); (3) a step of fixing the movable lead block to the rotary body such that the cable in the wiring space and the movable end portion have the same height as each other in a direction along a rotation center line of the rotary body; and (4) a step of fixing the fixed lead block to the housing simultaneously with or before or after the step of (3) such that the cable in the wiring space and the fixed end portion have the same height as each other in the direction along the rotation center line.

In the manufacturing method of the present invention, preferably, in the step of (3), the movable lead block is assembled to the rotary body in the direction along the rotation center line of the rotary body, and in the step of (4), the fixed lead block is assembled to the housing in the direction along the rotation center line of the rotary body.

In the manufacturing method of the present invention, preferably, in the step of (3), the movable lead block is fixed to the rotary body, sequentially, the cable is wound around the outer circumferential surface of the rotary body, and thereafter, in the step of (4), the fixed lead block is fixed to the housing.

In the manufacturing method of the present invention, after the cable is wound around the outer circumferential surface of the rotary body, the housing and the rotary body may be combined with each other, and thereafter, in the step of (4), the fixed lead block may be fixed to the housing.

In the manufacturing method of the present invention, in the steps of (1) and (2), the cable may be fixed to the movable lead block and the fixed lead block without being bent.

In the rotary connector of the present invention, the cable positioned in the wiring space, and the movable end portion and the fixed end portion of the cable are positioned at approximately the same height as each other in the direction along the rotation center line of the rotary body. Accordingly, it is not necessary to extract the end portion of the cable to a height position different from that of the wiring space, and it is not necessary to three-dimensionally bend the end portion of the cable. Since the cable is not three-dimensionally bent, excessive stress is not applied to the cable in the wiring space, and the cable smoothly follows the rotation of the rotary body.

In the manufacturing method of a rotary connector of the present invention, since the movable lead block and the fixed lead block are incorporated into the rotary body and the housing at the same height position as that of the wiring space, the cable can be disposed in the wiring space, an assembly operation is easy, and it is possible to automate an assembly process.

In the rotary connector of the present invention, since at least a portion of the movable lead block configures the outer circumferential surface of the rotary body and at least a portion of the fixed lead block configures the inner circumferential surface of the housing, it is possible to decrease regions in which the movable lead block and the fixed lead block occupy in the housing, and it is possible to configure a small and thin rotary connector.

DESCRIPTION OF THE PREFERRED EMBODIMENTS

Figure 7:
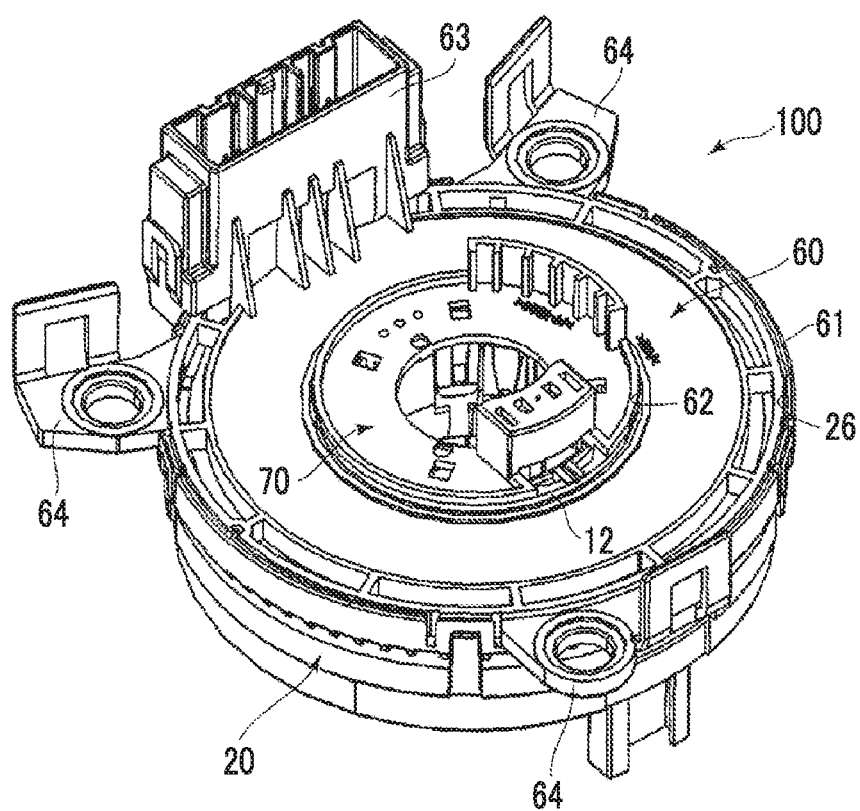
FIG. 7 is a perspective view of an assembled rotary connector.
Figure 8:
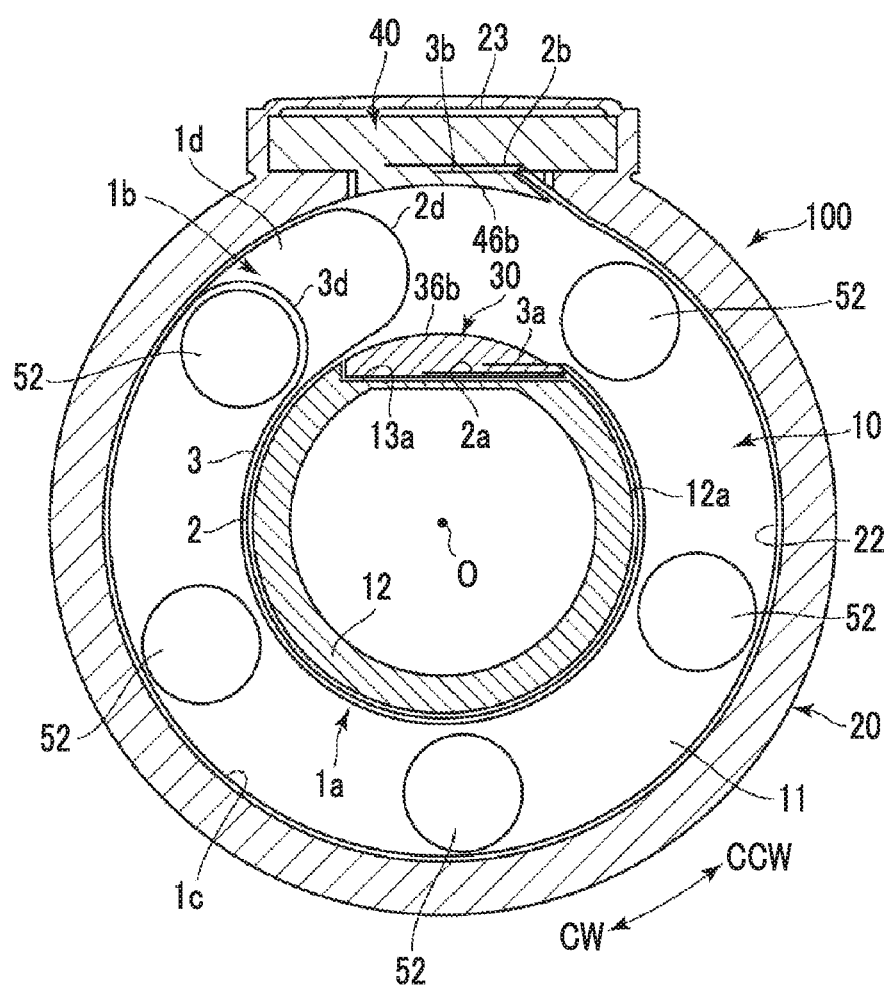
FIG. 8 is a sectional view explaining an outline of an inner structure of the rotary connector.

Hereinafter, with reference to FIGS. 1 to 8, a structure of a rotary connector 100 and an assembly process thereof will be described. FIGS. 7 and 8 show the assembled rotary connector 100.

<Cable Structure 1 and Assembly Process Thereof>

Figure 1:
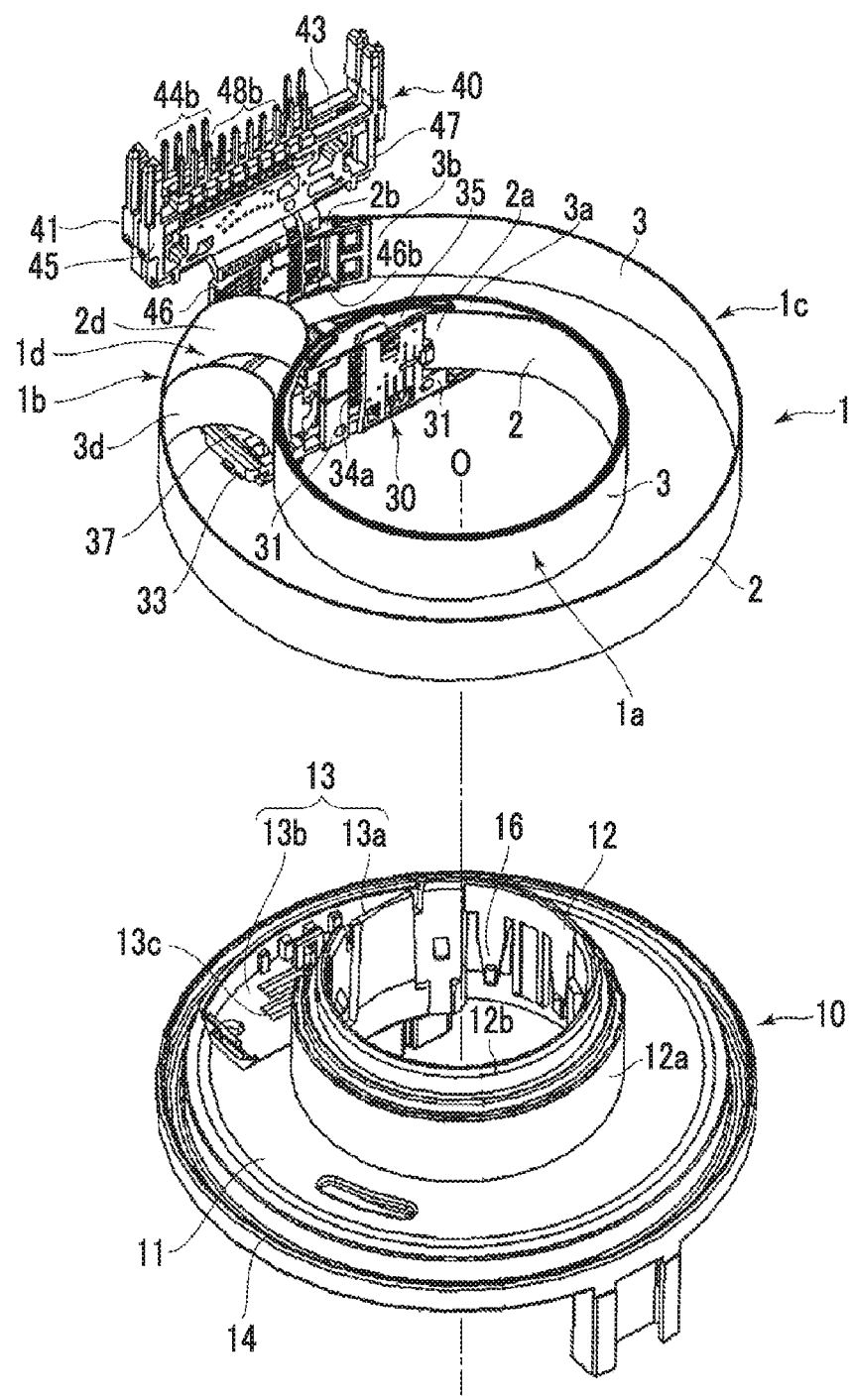
FIG. 1 is an exploded perspective view showing a process of attaching a cable structure, in which two cables are combined with each other, to the rotary body.

FIG. 1 shows a cable structure 1. In the cable structure 1, a first cable 2 and a second cable 3 are combined with each other. The first cable 2 and the second cable 3 are strip cables (flat cables), and include a plurality of conductor wires (conductor portions) which extend in parallel to each other in a longitudinal direction of the cable, and an insulating resin layer which coats the conductor wires. The first cable 2 and the second cable 3 overlap so as to be coincident with each other in a width direction.

Figure 4:
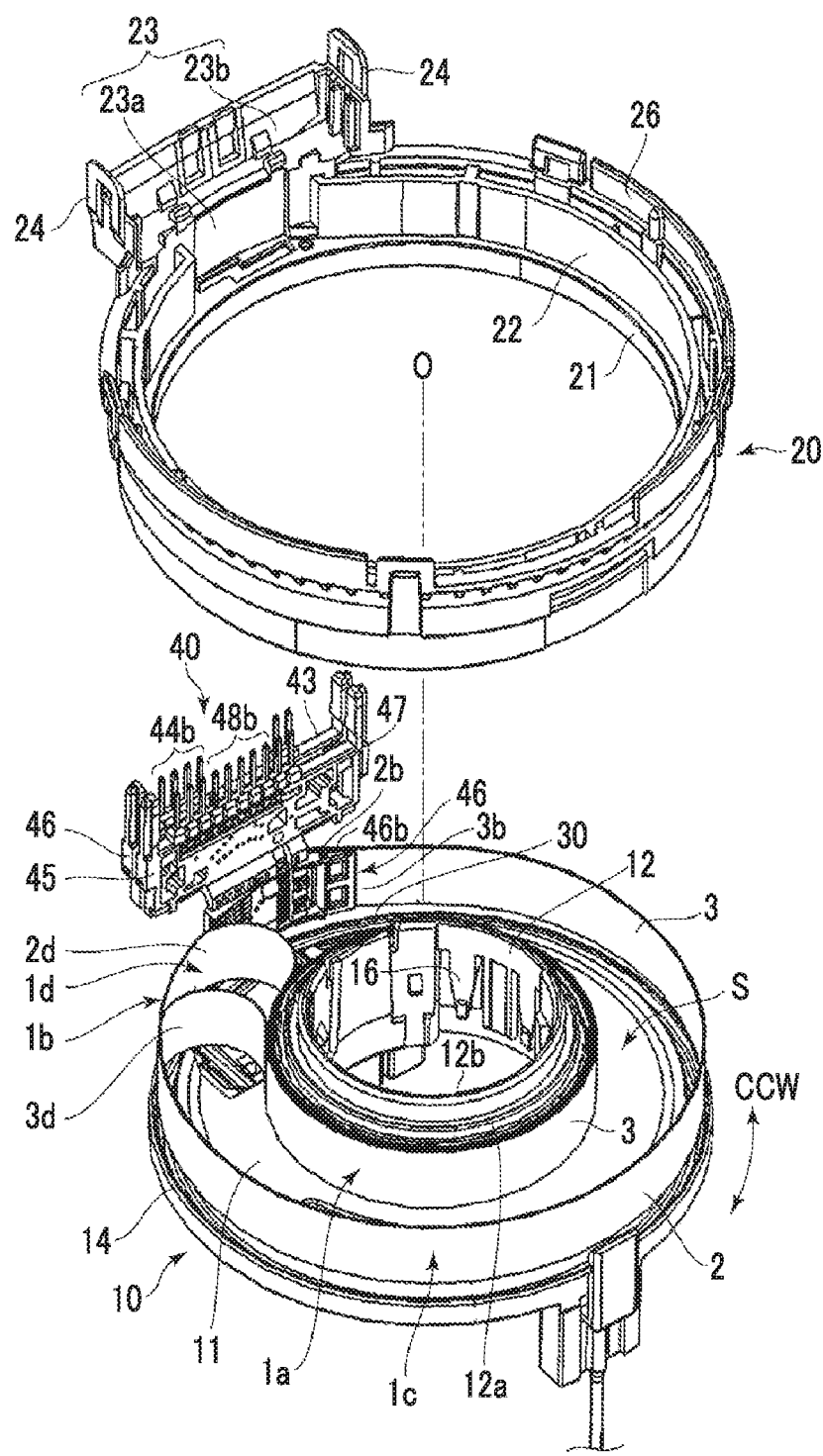
FIG. 4 is an exploded perspective view showing a process in which the two cables are attached to the rotary body and a lower housing is combined with the rotary body.
Figure 5:
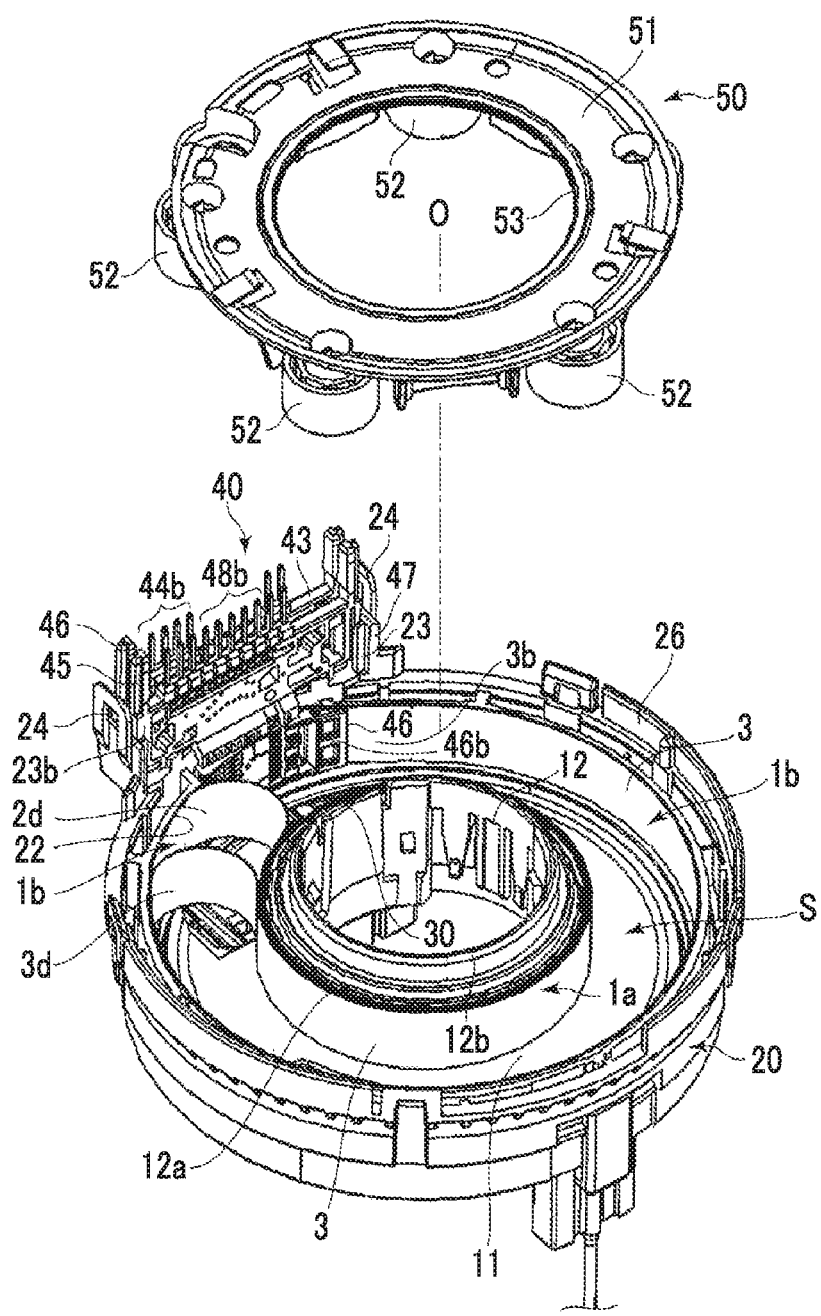
FIG. 5 is an exploded perspective view showing a process in which a roller rotating portion is assembled into the lower housing.

An annular wiring space S shown in FIG. 5 is formed between an outer circumferential surface 12a of the cylindrical portion 12 formed in a rotary body 10 shown in FIG. 1 and an inner circumferential surface 22 of a lower housing 20 shown in FIG. 4, and the cable structure 1 is accommodated into the wiring space S. In the wiring space S, two cables 2 and 3 overlap each other and are wound around an outer circumferential surface 12a of the cylindrical portion 12 so as to circulate around a rotation center line O of the rotary body 10, and an inner circulation portion 1a of the cable structure 1 is formed. In the inner circulation portion 1a, the first cable 2 appears in the inside, and the second cable 3 appears in the outside.

In the wiring space S, winding directions of two cables 2 and 3 wound as the inner circulation portion 1a are inverted by an inversion portion 1b, and the two cables 2 and 3 are further wound as an outer circulation portion 1c. The winding direction of the inner circulation portion 1a and the winding direction of the outer circulation portion 1c are opposite to each other, and as shown in FIG. 5, the outer circulation portion 1c is wound around the inner circumferential surface 22 of the lower housing 20. In the outer circulation portion 1c, the second cable 3 appears in the inside, and the first cable 2 appears in the outside.

The length of the first cable 2 is longer than the length of the second cable 3, and in the inversion portion 1b, an inversion gap 1d is formed between an inversion portion 2d of the first cable 2 and an inversion portion 3d of the second cable 3.

Figure 2:
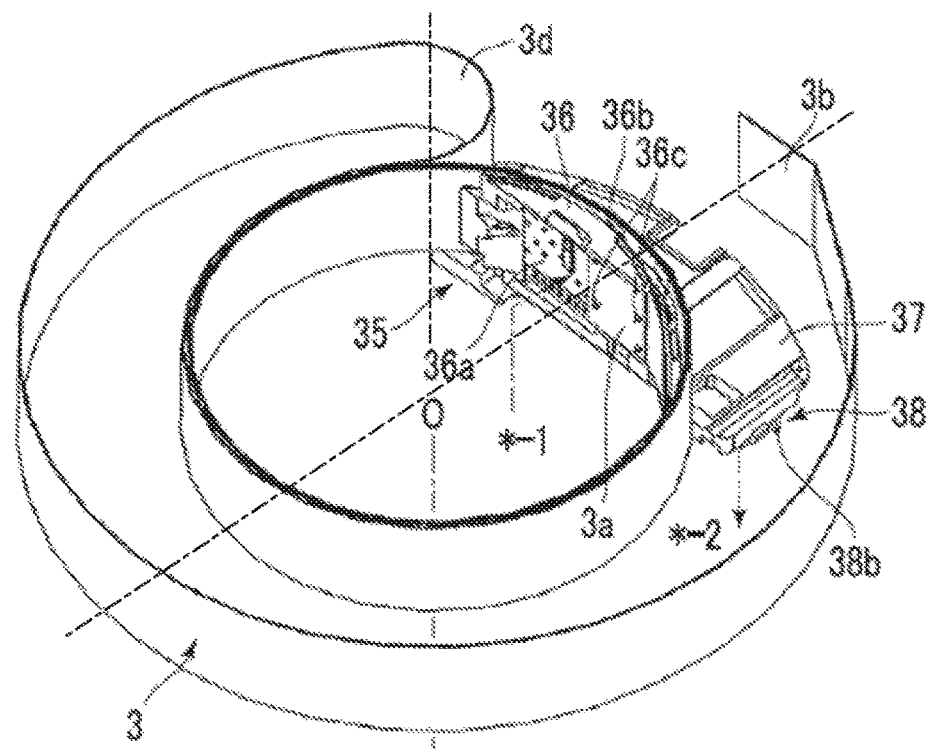
FIG. 2 is an exploded perspective view showing a state where a movable lead block is attached to each of the two cables.
Figure 2:
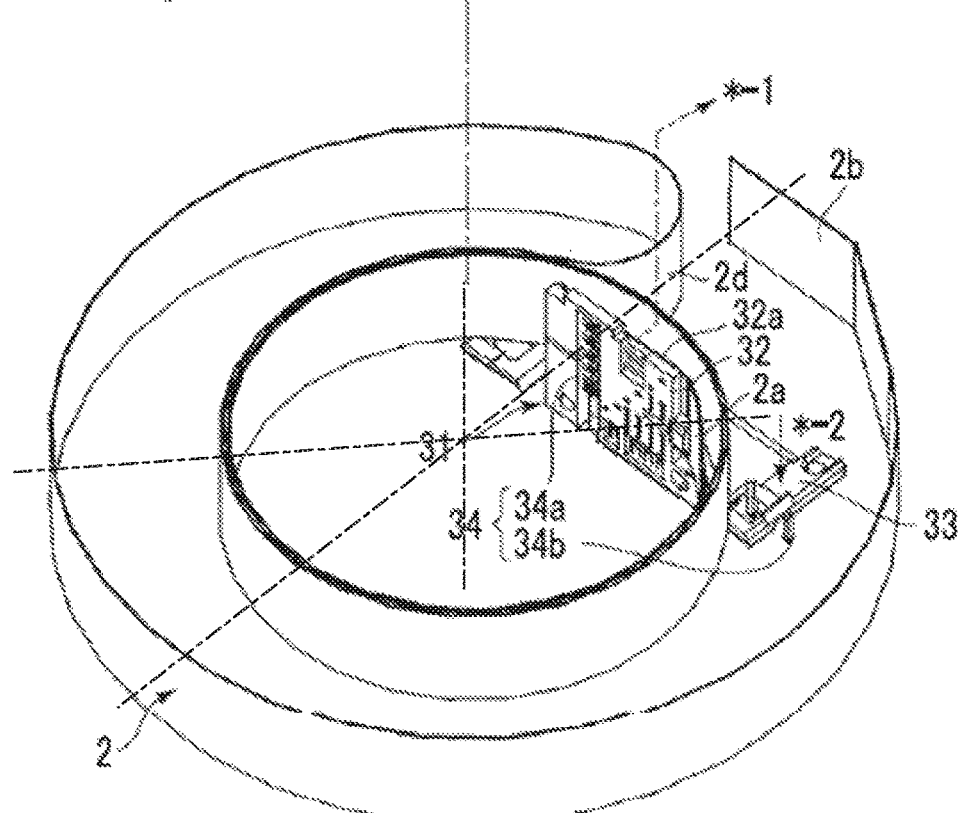
Figure 3:
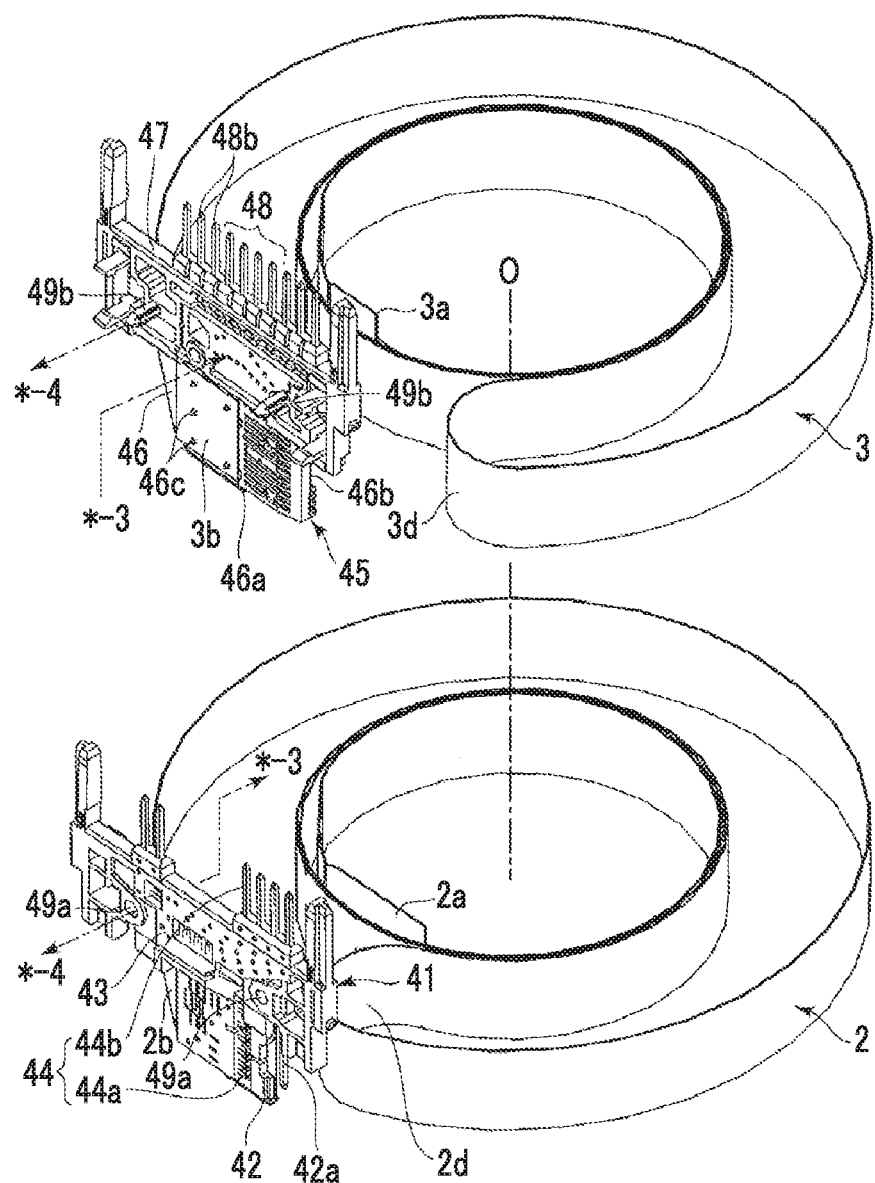
FIG. 3 is an exploded perspective view showing a state where a fixed lead block is attached to each of the two cables.

FIGS. 2 and 3 shows a state where the first cable 2 and the second cable 3 configuring the cable structure 1 are vertically separated from each other.

As shown in FIG. 1, a movable end portion 2a of the first cable 2 and a movable end portion 3a of the second cable 3 are fixed to a movable lead block 30. As shown in FIG. 2, the movable lead block 30 is configured such that a movable inner block 31 and a movable outer block 35 are combined with each other.

The movable inner block 31 is formed of a synthetic resin material, and in the movable inner block 31, a cable fixing portion 32 which rises in parallel with the rotation center line O of the rotary body 10, and a terminal leading portion 33 which extends so as to be perpendicular to the rotation center line O are integrally formed. A plurality of movable terminals 34 are embedded in the movable inner block 31. Each of the plurality of movable terminals 34 is formed by punching a conductive metal material. Each movable terminal 34 includes a movable connection portion 34a and a movable extension end portion 34b. Each movable terminal 34 is bent, and the movable connection portion 34a extends in the direction intersecting (orthogonal to) the rotation center line O in the cable fixing portion 32. The movable extension end portion 34b extends downward from the lower surface of the terminal leading portion 33 in parallel with the rotation center line O.

In the cable fixing portion 32, a support surface 32a is formed toward the outside, and the movable connection portion 34a of each movable terminal 34 is exposed from the support surface 32a. The support surface 32a is a flat surface which extends in parallel with the rotation center line O. The movable end portion 2a of the first cable 2 overlaps the support surface 32a, a protrusion which protrude from the support surface 32a is locked to a hole which is formed in the movable end portion 2a, and the movable end portion 2a is positioned on the support surface 32a. In addition, the insulating resin layer is removed at the movable end portion 2a such that a conductor portion (a portion of the conductor wire) is exposed, the movable connection portion 34a of each movable terminal 34 is individually welded and connected to each conductor portion, and both are conducted with each other.

As shown in FIG. 2, the movable outer block 35 is formed of a synthetic resin material, and in the movable outer block 35, a cable fixing portion 36 which rises in parallel with the rotation center line O, and a terminal leading portion 37 which extends so as to be perpendicular to the rotation center line O are integrally formed. The cable fixing portion 36 includes a support surface 36a facing the inside, and an outer surface 36b facing the outside. The support surface 36a is a flat surface which is parallel with the rotation center line O, and the outer surface 36b is coincident with a portion of a cylindrical surface which has the rotation center line O as the center.

A plurality of movable terminals 38 are embedded in the movable outer block 35. Each of the plurality of movable terminals 38 is formed by punching a conductive metal material. Each movable terminal 38 includes a movable connection portion 38a and a movable extension end portion 38b. In addition, in FIG. 2, since the movable connection portion 38a is covered by the movable end portion 3a of the second cable 3, the movable connection portion 38a does not appear in FIG. 2.

Each movable terminal 38 is bent, and the movable connection portion 38a extends in the direction intersecting (orthogonal to) the rotation center line O, and is exposed to the support surface 36a of the cable fixing portion 36. The movable extension end portion 38b extends downward from the lower surface of the terminal leading portion 37 in parallel with the rotation center line O.

The movable end portion 3a of the second cable 3 overlaps the support surface 36a of the cable fixing portion 36 from the inside, a protrusion 36c which protrude from the support surface 36a is locked to a hole which is formed in the movable end portion 2a, and the movable end portion 2a is positioned on the support surface 36a. In addition, the insulating resin layer is removed at the movable end portion 3a such that a conductor portion (a portion of the conductor wire) is exposed, the movable connection portion 38a of each movable terminal 38 is individually welded and connected to each conductor portion, and both are conducted with each other.

As shown in FIG. 1, the support surface 32a of the movable inner block 31 overlaps the support surface 36a of the movable outer block 35 from the inside, and the terminal leading portion 33 of the movable inner block 31 overlaps the lower side of the terminal leading portion 37 of the movable outer block 35. In addition, the movable inner block 31 and the movable outer block 35 is positioned and joined to each other by recess/protrusion fitting, and the movable lead block 30 shown in FIG. 1 is assembled. If the movable lead block 30 is assembled, in a state where the movable end portion 2a of the first cable 2 and the movable end portion 3a of the second cable 3 overlap each other, the movable lead block 30 is interposed between the cable fixing portion 32 of the movable inner block 31 and the cable fixing portion 36 of the movable outer block 35. This state is also shown in FIG. 8.

Moreover, in a state where the movable extension end portion 34b of the movable terminal 34 provided on the movable inner block 31, and the movable extension end portion 38b of the movable terminal 38 provided on the movable outer block 35 are arranged, the movable extension end portion 34b and the movable extension end portion 38b protrude downward from the movable lead block 30.

As shown in FIG. 1, the fixed end portion 2b of the first cable 2 and the fixed end portion 3b of the second cable 3 are fixed to the fixed lead block 40. As shown in FIG. 3, the fixed lead block 40 is configured of a fixed outer block 41 and a fixed inner block 45.

As shown in FIG. 3, the fixed outer block 41 is formed of a synthetic resin material, and a cable fixing portion 42 and a terminal leading portion 43 are integrally formed so as to be continued in a vertical direction which is the direction along the rotation center line O. A plurality of fixed terminals 44 are embedded in the fixed outer block 41. Each of the plurality of fixed terminals 44 is formed by punching a conductive metal material. Each fixed terminal 44 includes a fixed connection portion 44a and a fixed extension end portion 44b. Each fixed terminal 44 is bent, and the fixed connection portion 44a extends in a direction intersecting (orthogonal to) the rotation center line O in the cable fixing portion 42. The fixed extension end portion 44b extend upward from the upper end portion of the terminal leading portion 43 in parallel with the rotation center line O.

A support surface 42a is formed toward the inside in the cable fixing portion 42, and the fixed connection portion 44a of each fixed terminal 44 is exposed to the support surface 42a. The support surface 42a is a flat surface which extends in parallel with the rotation center line O. The fixed end portion 2b of the first cable 2 overlaps the support surface 42a, a protrusion which protrudes from the support surface 42a is locked to a hole which is formed in the fixed end portion 2b, and the fixed end portion 2b is positioned on the support surface 42a. In addition, the insulating resin layer is removed at the fixed end portion 2b such that the conductor portion (a portion of the conductor wire) is exposed, and the movable connection portion 44a of each fixed terminal 44 is individually welded and connected to each conductor portion, and both are conducted with each other.

As shown in FIG. 3, the fixed inner block 45 is formed of a synthetic resin material, and a cable fixing portion 46 and a terminal leading portion 47 are integrally formed so as to be vertically continued. The cable fixing portion 46 includes a support surface 46a facing the outside and an inner surface 46b facing the inside. The support surface 46a is a flat surface which is parallel with the rotation center line O. As shown in FIG. 1, the inner surface 46b is coincident with a portion of a cylindrical surface which has the rotation center line O as the center.

A plurality of fixed terminals 48 are embedded in the fixed inner block 45. Each of the plurality of fixed terminals 48 is formed by punching a conductive metal material. Each fixed terminal 48 includes a fixed connection portion 48a and a fixed extension end portion 48b. In addition, in FIG. 3, since the fixed connection portion 48a is covered by the fixed end portion 3b of the second cable 3, the fixed connection portion 48a does not appear in FIG. 3.

Each fixed terminal 48 is bent, and the fixed connection portion 48a extends in the direction intersecting (orthogonal to) the rotation center line O and is exposed to the support surface 46a of the cable fixing portion 46. The fixed extension end portion 48b extends upward from the upper end portion of the terminal leading portion 47 in parallel with the rotation center line O.

The fixed end portion 3b of the second cable 3 overlaps the support surface 46a of the cable fixing portion 46, a protrusion 46c which protrudes from the support surface 46a is locked to a hole which is formed in the fixed end portion 3b, and the fixed end portion 3b is positioned on the support surface 46a. In addition, the insulating resin layer is removed at the fixed end portion 3b such that a conductor portion (a portion of the conductor wire) is exposed, the movable connection portion 48a of each fixed terminal 48 is individually welded and connected to each conductor portion, and both are conducted with each other.

As shown in FIG. 1, the fixed outer block 41 overlaps the outside of the fixed inner block 45, and a shown in FIG. 3, a positioning hole 49a formed in the fixed outer block 41 engages with a positioning protrusion 49b formed in the fixed inner block 45, and the fixed outer block 41 and the fixed inner block 45 are combined so as to be positioned to each other. At this time, the cable fixing portion 42 of the fixed outer block 41 overlaps the outside of the cable fixing portion 46 of the fixed inner block 45, and the terminal leading portion 43 of the fixed outer block 41 overlaps the outside of the terminal leading portion 47 of the fixed inner block 45.

As shown in FIG. 1, if the fixed lead block 40 is assembled, in a state where the fixed end portion 2b of the first cable 2 and the fixed end portion 3b of the second cable 3 overlap each other, the fixed lead block 40 is interposed between the cable fixing portion 42 and the cable fixing portion 46. This state is also shown in FIG. 8.

Moreover, in a state where the fixed extension end portion 44b of the fixed terminal 44 provided on the fixed outer block 41, and the fixed extension end portion 48b of the fixed terminal 48 provided on the fixed inner block 45 are arranged to each other, the fixed extension end portion 44b and the fixed extension end portion 48b protrude upward from the fixed lead block 40.

<Assembly Process of Cable Structure 1 to Rotary Body 10>

As shown in FIG. 1, the rotary body 10 is formed of a synthetic resin material, and in the rotary body 10, a support flange portion 11 and the cylindrical portion 12 are integrally formed. The rotation center line O of the rotary body 10 is coincident with the center of the cylindrical portion 12.

A lead block attachment portion 13 is formed in the rotary body 10. The lead block attachment portion 13 includes a cable attachment portion 13a which is formed in a concave shape on a portion of the outer circumferential surface of the cylindrical portion 12, and a terminal attachment portion 13b which is formed in a convex shape on a portion of the upper surface of the support flange portion 11. The cable attachment portion 13a is also shown in FIG. 8.

In the assembly process of the rotary connector 100, first, as shown in FIG. 4, the movable lead block 30 of the cable structure 1 is attached to the lead block attachment portion 13 of the rotary body 10.

In this process, the movable lead block 30 is assembled downward from the upper side along the rotation center line O, the cable fixing portions 32 and 36 of the movable lead block 30 are installed on the cable attachment portion 13a which is formed in the cylindrical portion 12, and the terminal leading portions 33 and 37 are installed on the terminal attachment portion 13b which is formed in the support flange portion 11. The movable lead block 30 is fitted the lead block attachment portion 13 which is formed in a concave shape so as to be positioned and fixed. At this time, as shown in FIG. 1, the movable extension end portions 34b and 38b of the plurality of the movable terminals 34 and 38 protruding downward from the movable lead block 30 are inserted into a through hole 13c which is formed in the terminal attachment portion 13b of the support flange portion 11, and protrude to the shown lower side of the rotary body 10.

When the movable lead block 30 is attached to the rotary body 10, the inner circulation portion 1a or the outer circulation portion 1c is formed in the first cable 2 and the second cable 3.

In a specific assembly process, in a state where the rotary body 10 is installed in a rotary jig (not shown), as described above, the movable lead block 30 is attached to the rotary body 10 from the upper side along the rotation center line O. In addition, the fixed lead block 40 is held to a holding jig (not shown) in the direction shown in FIGS. 1 and 4.

Moreover, if the rotary jig and the rotary body 10 are rotated in the counterclockwise direction (CCW), in a state where the first cable 2 and the second cable 3 overlap each other, the first cable 2 and the second cable 3 are wound around the outer circumferential surface 12a of the cylindrical portion 12 of the rotary body 10, and the inner circulation portion 1a is formed. In addition, since the fixed lead block 40 is held by the holding jig in the direction shown in FIGS. 1 and 4, the outer circulation portion 1c and the inversion portion 1b are formed in the first cable 2 and the second cable 3.

As shown in FIG. 8, if the movable lead block 30 is attached to the rotary body 10, the outer surface 36b of the cable fixing portion 36 formed in the movable outer block 35 is continuous with the outer circumferential surface 12a of the cylindrical portion 12 of the rotary body 10, and the outer surface 36b functions as a portion of the cylindrical outer circumferential surface 12a. Accordingly, in the inner circulation portion 1a, the first cable 2 and the second cable 3 are wound around the surfaces of the outer circumferential surface 12a and the outer surface 36b.

As shown in FIG. 4, in a state where the movable lead block 30 is attached to the rotary body 10, since the movable end portion 2a of the first cable 2 and the movable end portion 3a of the second cable 3 are positioned at the same heights as those of the cables 2 and 3 wound around the outer circumferential surface 12a, that is, the movable end portions 2a and 3a and the wounded portions of cables 2 and 3 are aligned with one another at the same level in the direction along the rotation center line of the rotary body, when the rotary body 10 rotates, the cables 2 and 3 can be smoothly wound around the outer circumferential surface 12a.

<Assembly Process of Rotary Body 10 and Lower Housing 20>

The lower housing 20 is shown in FIG. 4. The lower housing 20 is formed of a synthetic resin material.

In the lower housing 20, the cylindrical inner circumferential surface 22 is formed in the inside, and a lead block attachment portion 23 is formed outside the inner circumferential surface 22. In the lead block attachment portion 23, a cable attachment portion 23a and a terminal attachment portion 23b are integrally formed so as to be vertically continued. In the cable attachment portion 23a, a portion of the inner circumferential surface 22 is cut, and the cable attachment portion 23a is formed so as to be recessed in the outer circumferential direction. The terminal attachment portion 23b is continuously formed in a rectangular frame shape on the cable attachment portion 23a.

As shown in FIG. 4, the movable lead block 30 is attached to the rotary body 10, the rotary body 10 rotates in the counterclockwise direction (CCW), the first cable 2 and the second cable 3 are wound around the cylindrical portion 12, the inner circulation portion 1a and the outer circulation portion 1c are formed, and thereafter, the lower housing 20 is assembled to the rotary body 10.

A rotary receiving portion 21 is formed around the opening portion of the shown lower side of the lower housing 20, and as shown in FIGS. 1 and 4, a support step portion 14 is formed on the outer circumferential edge of the support flange portion 11 of the rotary body 10. If the lower housing 20 is mounted to the rotary body 10 downward from the upper side, the rotary receiving portion 21 of the lower housing 20 overlaps the support step portion 14 of the rotary body 10, the rotary receiving portion 21 and the support step portion 14 are fitted to each other, and the rotary body 10 is combined with the lower housing 20 so as to be rotatable about the rotation center line O.

If the lower housing 20 and the rotary body 10 are combined with each other, the annular wiring space S is formed between the outer circumferential surface 12a of the cylindrical portion 12 of the rotary body 10 and the inner circumferential surface 22 of the lower housing 20, and the first cable 2 and the second cable 3 are disposed inside the wiring space S.

In the process in which the lower housing 20 is assembled to the rotary body 10, the fixed lead block 40 is held on the cylindrical portion 12 or the like. Moreover, when the lower housing 20 and the rotary body 10 are combined with each other, as shown in FIG. 5, the fixed lead block 40 is fixed to the lead block attachment portion 23 of the lower housing 20.

In this process, the fixed lead block 40 is assembled from the upper side toward the lower side along the rotation center line O and is inserted into the lead block attachment portion 23 formed in the lower housing 20. At this time, the cable fixing portions 42 and 46 of the fixed lead block 40 are fitted to the cable attachment portion 23a, and the terminal leading portions 43 and 47 are fitted to the terminal attachment portion 23b formed in the lower housing 20. In addition, as shown in FIG. 5, in the recess/protrusion locking portion 24, the fixed lead block 40 is recess/protrusion locked to the lead block attachment portion 23, and the fixed lead block 40 is fixed to the lower housing 20.

As shown in FIG. 5, the fixed lead block 40 is attached to the lead block attachment portion 23 of the lower housing 20, the inner surface 46b of the cable fixing portion 46 of the fixed inner block 45 is continuous with the inner circumferential surface 22 of the lower housing 20, the inner circumferential surface 22 and the inner surface 46b have a continuous cylindrical surface, and when the rotary body 10 rotates, the first cable 2 and the second cable 3 are wound around the inner circumferential surface 22 and the inner surface 46b from the inside.

As shown in FIG. 5, when the fixed lead block 40 is attached to the lower housing 20, since the fixed end portion 2b of the first cable 2 and the fixed end portion 3b of the second cable 3 are positioned at the same heights as those of the cables 2 and 3 in the wiring space S, that is, the fixed end portions 2b and 3b and the winding portions of the cables 2 and 3 in the wiring space are aligned with one another at the same level in the wiring space S in the direction along the rotation center line of the rotary body, an excessive force is not applied to the fixed end portions 2b and 3b of the cables 2 and 3, and the cables 2 and 3 circulating around the inner portion of the wiring space S.

Moreover, as shown in FIG. 5, the fixed extension end portions 44b and 48b of the fixed terminals 44 an 48 provided in the fixed lead block 40 protrude upward from the lead block attachment portion 23 of the lower housing 20.

In the assembly process, the movable lead block 30 is assembled to the cylindrical portion 12 of the rotary body 10 downward from the upper side, the rotary body 10 rotates, and the inner circulation portion 1a, the inversion portion 1b, and the outer circulation portion 1c are formed. Thereafter, the lower housing 20 is combined with the rotary body 10, the fixed lead block 40 is lowered from the upper side so as to be attached to the lead block attachment portion 23 of the lower housing 20, and the inner circulation portion 1a, the inversion portion 1b, and the outer circulation portion 1c are accommodated in the wiring space S.

In this way, by simply mounting the movable lead block 30 and the fixed lead block 40 downward from the upper side without complicatedly bending the first cable 2 and the second cable 3, it is possible to simply attach the cable structure 1 to the rotary body 10 and the lower housing 20. Accordingly, it is possible to easily perform an automatic assembly operation using an automatic machine.

In addition, the assembly process may be reversely performed with respect to the above-described embodiment. That is, first, the fixed lead block 40 is attached to the lower housing 20, the lower housing 20 rotates, the inner circulation portion 1a, the inversion portion 1b, and the outer circulation portion 1c are formed, and thereafter, the lower housing 20 and the rotary body 10 are combined with each other, and the movable lead block 30 may be attached to the rotary body 10. Alternatively, the inner circulation portion 1a, the inversion portion 1b, and the outer circulation portion 1c are formed in the cable structure 1 in advance, and the fixed lead block 40 and the movable lead block may be simultaneously assembled to each other.

Moreover, in the present invention, if the movable end portions 2a and 3a and the fixed end portions 2b and 3b are positioned at the same height as that of the wiring space S, that is, they are aligned with one another at the same level in the wiring space S in the direction along the rotation center line of the rotary body as shown in FIGS. 1 and 4, the movable end portions 2a and 3a and the fixed end portions 2b and 3b may be bent by a two-folding or the like such as the inversion portions 2d and 3d as shown in FIG. 1, and be fixed to the lead blocks 30 and 40.

<Assembly Process of Roller Rotating Portion 50>

As shown in FIG. 5, after the lower housing 20 and the rotary body 10 are combined with each other, the roller rotating portion 50 is attached into the lower housing 20. The roller rotating portion 50 includes annular roller support plate 51, and a plurality of rollers 52 which are rotatably supported below the roller support plate 51. As shown in FIG. 8, five rollers are provided on the roller support plate 51 with equal intervals therebetween in the rotation direction.

Figure 6:
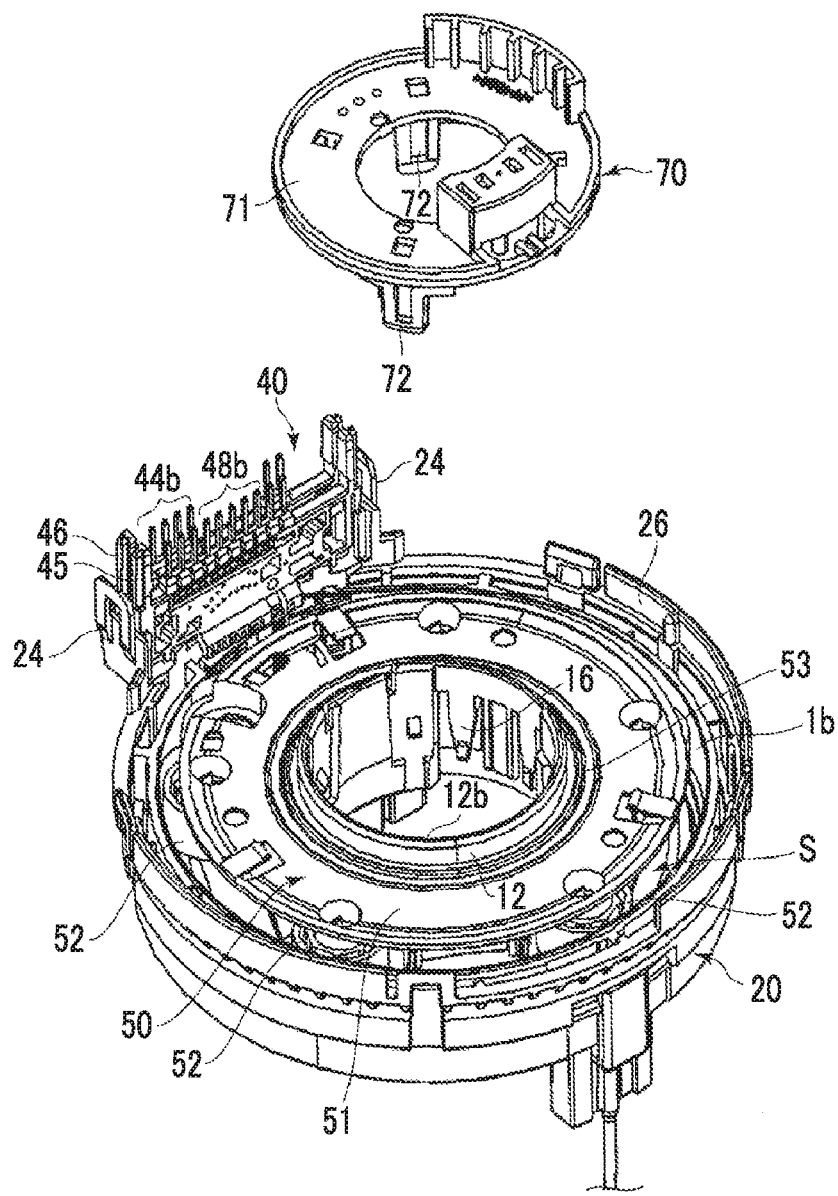
FIG. 6 is an exploded perspective view showing a state where the lower rotating portion is attached to the rotary body.

As shown in FIG. 6, a center hole 53 of the roller support plate 51 is rotatably mounted on the cylindrical portion 12 of the rotary body 10. At this time, as shown in FIG. 8, each roller 52 enters the inner portion of the wiring space S, and each roller 52 is interposed between the inner circulation portion 1a and the outer circulation portion 1c of the cables 2 and 3 of the cable structure 1.

<Attachment Process of Upper Housing 60 and Upper Cap 70>

As shown in FIG. 6, after the roller rotating portion 50 is mounted in the lower housing 20, an upper housing 60 shown in FIG. 7 is mounted, and thereafter, a upper cap 70 shown in FIGS. 6 and 7 is attached.

The upper housing 60 is formed of a synthetic resin, and has a circular outer circumferential edge portion 61 on the outer circumferential side and a circular hole portion 62 on the inner circumferential side. The upper housing 60 is mounted on the opening portion of the lower housing 20, and the outer circumferential edge portion 61 is fitted to the inner side of an opening edge portion 26 of the lower housing 20. Moreover, an upper end portion 12b of the cylindrical portion 12 of the rotary body 10 is rotatably held inside the hole portion 62 of the upper housing 60.

An angular tubular connector portion 63 is integrally formed on the upper housing 60, and as shown in FIGS. 5 and 6, extended end portions 44b and 48b of the fixed terminals 44 and 48 extending from the fixed lead block 40 are accommodated inside the connector portion 63. In addition, a fixing piece 64 for fixing the upper housing 60 to a steering device is integrally formed in the upper housing 60.

After the upper housing 60 is mounted on the lower housing 20, the upper cap 70 is mounted on the upper end portion 12b of the cylindrical portion 12 which is positioned inside the hole portion 62 of the upper housing 60. As shown in FIG. 6, the upper cap 70 is formed of a synthetic resin, and in the upper cap 70, a disk-shaped cover portion 71 and a locking piece 72 extending downward from the cover portion 71 are integrally formed. Meanwhile, a locking protrusion 16 is integrally formed on the inner surface of the cylindrical portion 12 of the rotary body 10. If the upper cap 70 is mounted on the upper end portion 12b of the cylindrical portion 12, the outer circumferential portion of the cover portion 71 overlaps the edge portion of the hole portion 62 of the upper housing 60.

The locking piece 72 is inserted into the cylindrical portion 12, and is locked to the locking protrusion 16. Accordingly, as shown in FIG. 7, the rotary body 10 and the upper cap 70 are connected to each other, and the rotary body 10 and the upper cap 70 are rotatably supported without being extracted from the lower housing 20 and the upper housing 60. In addition, in the wiring space S, the roller support plate 51 is rotatable following the rotation of the rotary body 10.

<Operation and Effect of Rotary Connector>

As shown in FIGS. 7 and 8, the assembled rotary connector 100 is mounted on a steering device of an automobile. The cylindrical portion 12 of the rotary body 10 is mounted on a steering shaft, and the rotary body 10 rotates along with the steering shaft. The lower housing 20 and the upper housing 60 are fixed to the fixed side.

The movable terminals 34 and 38 provided in the movable lead block 30 are connected to wiring portions of a steering wheel side, and the fixed terminals 44 and 48 provided in the fixed lead block 40 are connected to wiring portions of a vehicle body side. By the first cable 2 and the second cable 3, an energization path with respect to an airbag device provided in the steering wheel or a wiring path with respect to an operation portion provided in the steering wheel is formed.

In FIG. 8, if the rotary body 10 rotates in the counterclockwise direction (CCW), the first cable 2 and the second cable 3 are released from the inner circumferential surface 22 of the lower housing 20 and are wound around the outer circumferential surface 12a of the cylindrical portion 12. If the rotary body rotates the clockwise direction (CW), the first cable 2 and the second cable 3 are released from the outer circumferential surface 12a of the cylindrical portion 12 and are wound around the inner circumferential surface 22 of the lower housing 20. Meanwhile, the roller support plate 51 and the roller 52 circulate about the rotation center line O in the wiring space S according to the circulation of the inversion portion 3d of the second cable 3.

Since the movable end portions 2a and 3a of the cables 2 and 3 fixed to the movable lead block 30, and the fixed end portions 2b and 3b of the cables 2 and 3 fixed to the fixed lead block 40 are positioned as the same heights as those of the cables 2 and 3 inside the wiring space S, it is not necessary to three-dimensionally bend the cables 2 and 3 so as to extend the movable end portions 2a and 3a or the fixed end portions 2b and 3b to the position corresponding to the height different from the wiring space S. Accordingly, an excessive stress is not applied to the cables 2 and 3 drawn around within the wiring space S, and the cables 2 and 3 smoothly move in the wiring space S without being subjected to an unnecessary friction force.

It should be understood by those skilled in the art that various modifications, combinations, sub-combinations and alterations may occur depending on design requirements and other factors insofar as they are within the scope of the appended claims of the equivalents thereof.

What is claimed is:

1. A rotary connector, comprising:
   a housing;
   a rotary body provided inside the housing;
   a movable lead block fixed to the rotary body and provided with at least one first terminal;
   a fixed lead block fixed to the housing and provided with at least one second terminal; and a strip-shaped cable accommodated in a wiring space formed between the housing and the rotary body, the cable winding around a rotation center line of the rotary body, the cable including:
- a first end portion fixed to the movable lead block such that a conductor of the cable is electrically connected to the first terminal; and
- a second end portion fixed to the fixed lead block such that the conductor of the cable is electrically connected to the second terminal, wherein a winding portion of the cable disposed in the wiring space, a top surface of the winding portion, a top surface of the first end portion, and a top surface of the second end portion are positioned approximately at a same level in a direction along the rotation center line of the rotary body.

2. The rotary connector according to claim 1, wherein the cable is fixed to the movable lead block and the fixed lead block without being bent at a different level from that of the winding space in the direction along the rotation center line of the rotary body.

3. The rotary connector according to claim 1, wherein the movable lead block is assembled to the rotary body in the direction along the rotation center line, and wherein the fixed lead block is assembled to the housing in the direction along the rotation center line.

4. The rotary connector according to claim 3, wherein the movable lead block is provided with a plurality of first terminals, each including:
- a first connection portion to which the conductor of the cable is connected, the first connection portion extending in a direction intersecting the rotation center line; and
- a first extension end portion which extends from the movable lead block in a direction parallel to the rotation center line, and wherein the fixed lead block is provided with a plurality of second terminals, each including:
- a second connection portion to which the conductor of the cable is connected, the second connection portion extending in the direction intersecting the rotation center line; and
- a second extension end portion which extends from the fixed lead block in the direction parallel to the rotation center line.

5. The rotary connector according to claim 1, wherein the rotary body has a circular outer circumferential surface, the housing has a circular inner circumferential surface, and the wiring space is formed between the outer circumferential surface and the inner circumferential surface, and wherein a surface of at least a portion of the movable lead block is exposed on the outer circumferential surface, and a surface of at least a portion of the fixed lead block is exposed on the inner circumferential surface.

6. The rotary connector according to claim 5, wherein the cable continues from the first end portion thereof so as to wind along the surface of at least a portion of the movable lead block and the outer circumferential surface of the rotary body, reverses a winding direction thereof in the wiring space, and then winds along the inner circumferential surface of the housing and the surface of at least a portion of the fixed lead block, reaching the second end portion thereof.

7. A manufacturing method of a rotary connector including a housing, a rotary body provided inside the housing, and a strip-shaped cable disposed in a wiring space formed between the housing and the rotary body, the method comprising the steps of:
(1) fixing a first end portion of the cable to a movable lead block so as to electrically connect, a conductor of the cable to at least one first terminal provided on the movable lead block;
(2) fixing a second end portion of the cable to a fixed lead block so as to electrically connect the conductor of the cable to at least one second terminal provided on the fixed lead block, simultaneously with, prior to, or after the step (1);
(3) fixing the movable lead block to the rotary body such that a top surface of a winding portion of the cable in the wiring space and a top surface of the first end portion are positioned approximately at a same level in a direction along a rotation center line of the rotary body; and
(4) fixing the fixed lead block to the housing simultaneously with, prior to, or after the step (3) such that the top surface of the winding portion of the cable in the wiring space and a top surface of the second end portion are positioned approximately at a same level in the direction along the rotation center line.

8. The manufacturing method of a rotary connector according to claim 7,
wherein in the step (3), the movable lead block is assembled to the rotary body in the direction along the rotation center line of the rotary body, and
wherein in the step (4), the fixed lead block is assembled to the housing in the direction along the rotation center line of the rotary body.

9. The manufacturing method of a rotary connector according to claim 7, wherein in the step (3), after the movable lead block is fixed to the rotary body, the cable is wound along an outer circumferential surface of the rotary body, and thereafter, in the step (4), the fixed lead block is fixed to the housing.

10. The manufacturing method of a rotary connector according to claim 9, wherein the step (3) further includes:
combining the housing and the rotary body with each other after the cable is wound along the outer circumferential surface of the rotary body, prior to performing the step (4).

11. The manufacturing method of a rotary connector according to claim 7, wherein in the steps (1) and (2), the cable is fixed to the movable lead block and the fixed lead block without being bent at a different level from that of the winding space in the direction along the rotation center line of the rotary body.

* * * * *